July 14, 1959 N. R. RICHMOND ET AL 2,894,769
SEALING DEVICE FOR RELATIVELY ROTATING PARTS
Filed Nov. 5, 1954
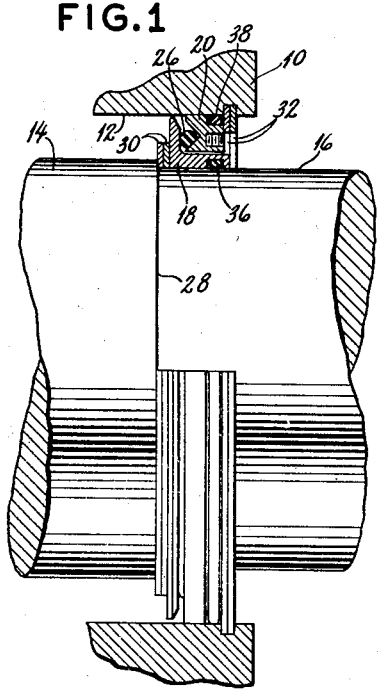
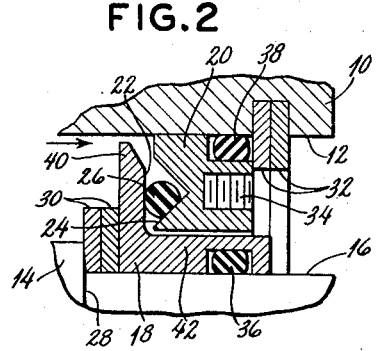
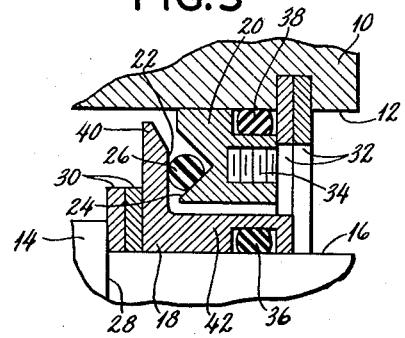
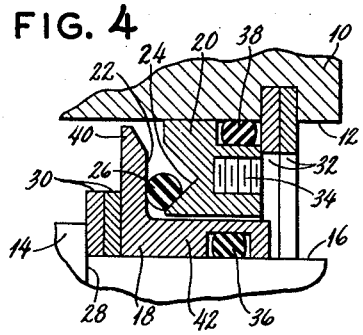
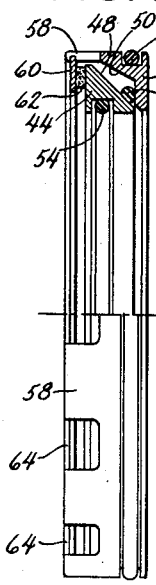
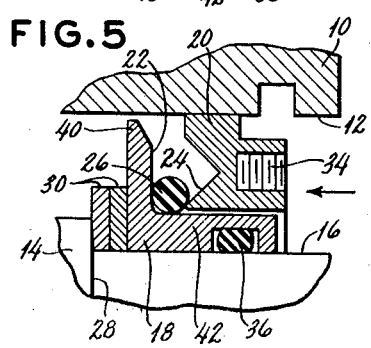
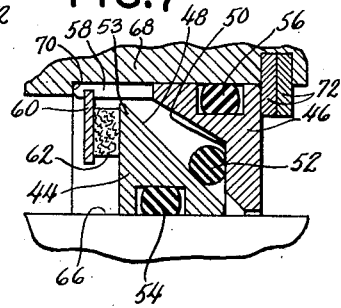
INVENTORS
NELSON R. RICHMOND
WALTER N. STONE
BY
S. Jay Teller
ATTORNEY

United States Patent Office 2,894,769
Patented July 14, 1959

2,894,769
SEALING DEVICE FOR RELATIVELY ROTATING PARTS

Nelson R. Richmond, Thompsonville, and Walter N. Stone, Bloomfield, Conn., assignors to The Kaman Aircraft Corporation, Bloomfield, Conn., a corporation of Connecticut Application November 5, 1954, Serial No. 467,148

7 Claims. (Cl. 286—11.13)

The invention relates to a sealing device for relatively rotating parts and more particularly to a sealing device for preventing the flow or escape of oil along a rotating shaft between said shaft and an exterior nonrotatable member which may be a housing.

The general object of the invention is to provide a sealing device of the type stated which is effective and reliable for the purpose stated, which is simple and inexpensive, which can be readily assembled, and which retains its effectiveness notwithstanding variations in the relationship of the parts.

In the drawing we have shown in detail two alternative embodiments of the invention, but it will be understood that various changes may be made from the constructions shown, and that the drawing is not to be construed as defining or limiting the scope of the invention, the claims forming a part of this specification being relied upon for that purpose.

Of the drawing:

Fig. 1 is a view partly in longitudinal vertical section showing a sealing device embodying the invention.

Fig. 2 is an enlarged view of a portion of Fig. 1.

Fig. 3 is a view similar to Fig. 2 but showing the inner rigid ring in an eccentric position.

Fig. 4 is a view similar to Fig. 2 but showing the outer ring moved longitudinally relatively to the inner ring.

Fig. 5 is a view similar to Fig. 2 but showing the oil seal only partly assembled.

Fig. 6 is a view somewhat similar to Fig. 1 but showing an alternative sealing device embodying the invention, this view omitting the shaft and housing.

Fig. 7 is an enlarged view of a portion of Fig. 6, this view showing fragments of the shaft and housing.

Referring to the drawing and more particularly to Figs. 1 and 2 thereof, 10 represents a housing having a cylindrical opening with an inner face 12. A rotatable shaft 14 extends concentrically through the housing opening, this shaft having a peripheral face 16. The shaft is rotatably supported, directly or indirectly, by two or more longitudinal spaced bearings that are not shown. The sealing device embodying the invention serves to prevent oil flow along the shaft between it and the housing.

The sealing device includes two closely spaced rigid rings 18 and 20 adapted to be positioned adjacent the opening in the housing 10 and surrounding the shaft 14, these rings being preferably, although not necessarily, formed of metal. For convenience they will be referred to respectively as the first and second rings. One ring which is shown as being the first ring 18 is engageable interiorly with the peripheral face 16 of the shaft and is rotatable therewith, all portions of said ring being spaced from the housing. The other ring which is shown as being the second ring 20 is engageable exteriorly with the inner face 12 of the housing opening and is nonrotatable, all portions of said ring being spaced from the shaft.

The rings 18 and 20 are provided respectively with outwardly diverging annular surfaces 22 and 24 which face each other and which have the included angle between them on the order of 45°. In referring to an angle on the order of 45° it is intended to include reasonable variations from the said angle but the variations should not be fore than 15°. In other words the included angle should not be less than 30° or more than 60°. A sealing ring 26 is provided which is adapted to extend around the shaft and which engages the surfaces 22 and 24 of the rings 18 and 20. The sealing ring 26 is formed of resilient flexible material which is impervious to or not affected by the oil or other liquid to be retained. The major diameter of the sealing ring is such that it is under substantial tension when engaged with the said surfaces 22 and 24. The ring 26 preferably has an initial circular cross sectional shape, the diameter of which will sometimes be referred to as the minor diameter of the ring. While the ring has an initial circular cross sectional shape, it is shown in Fig. 2 as having a somewhat distorted cross sectional shape by reason of the tension in the ring which forces it against the surfaces 22 and 24. The distortion or flattening of this and other sealing rings is considerably exaggerated in the drawing for greater clarity.

As shown, the surface 22 on the ring 18 is perpendicular to the shaft and the surface 24 on the ring 20 is conical and is inclined inwardly and toward the first ring at said angle on the order of 45°. The rings 18 and 20 are preferably relatively located approximately in the positions shown in Fig. 2 wherein the sealing ring 26 engages the perpendicular surface 22 on the ring 18 and engages the inclined conical surface 24 on the ring 20 at a zone spaced outwardly from the inner edge of last said surface.

The shaft 14 preferably has an annular shoulder 28 and one or more split snap rings 30, 30 are interposed between the shoulder 28 and the ring 18, said shoulder and said rings cooperating to limit movement of the ring 18 toward the left. The housing 10 preferably has an annular groove in the face 12 thereof and one or more split snap rings 32, 32 are entered in the said groove and engage the ring 20 to limit movement thereof toward the right, that is, in the direction away from the ring 18. The said groove and the said rings 32, 32 are of such size and are so positioned that the ring 20 is held in the proper relationship to the ring 18 with the sealing ring 26 engaging the inclined surface 24 approximately at the zone shown and described. It will be understood that the ring 20 and the sealing ring 26 are put in place before the rings 32, 32 are put in place, the rings 32, 32 when in place serving to hold the essential parts of the oil seal in proper relationship. The rings 32, 32 are removable to permit removal of the ring 20 and the sealing ring 26. In order to facilitate removal of the ring 20 said ring is provided with one or more tapped holes 34 into which screws can be entered.

The sealing ring 26 serves to prevent the escape of oil between the rotatable ring 18 and the nonrotatable ring 20. A sealing ring 36 is entered in an annular groove in the first ring 18 and engages the face 16 of the shaft to prevent the escape of oil between the ring 18 and the shaft. A sealing ring 38 is entered in an annular groove in the second ring 20 and engages the face 12 of the housing opening to prevent the escape of oil between the ring 20 and the housing.

An oil seal embodying the invention is effective either with the shaft 14 in rotation or with said shaft idle. However, the seal is particularly adapted for preventing the escape of oil in the direction indicated by the arrow in Fig. 2. To increase the effectiveness of the sealing ring 26, the rotatable ring 18 has an annular oil slinger portion 40 which is at the pressure side of the sealing ring and which extends outwardly so that its diameter is substantially larger than the exterior main diameter of the sealing ring. As shown, there is only a small clearance between the periphery of the portion 40 and the face 12 of the housing opening. As shown, the slinger portion 40 is a radial flange and said surface 22 is formed on said flange. As the slinger flange 40 rotates with the rotation of the shaft, centrifugal force acting upon the oil adjacent the ring tends to throw the oil outwardly and away from the sealing ring 26. Any oil that moves inwardly along the surface 22 of the flange 40 and actually reaches the ring 26 must first overcome the said centrifugal force, and the oil pressure, if any, at the ring is much less than it otherwise would be.

Preferably the first ring 18 has a hub 42 that extends away from the surface 22 and within the second ring 20. The hub 42 has an outer cylindrical face and only a small radial clearance is provided between the hub 42 and the ring 20.

Fig. 2 shows the parts of the oil seal in their preferred normal relationship. The number or the thickness of the snap rings 30, 30 can be varied to attain said normal relationship. While the Fig. 2 relationship is preferred, the construction of the oil seal is such that its effectivity is not impaired by reasonable variations from the normal relationship.

As shown in Fig. 3, it is assumed that the shaft 14 is not exactly straight and that at the oil seal it runs slightly eccentrically. Due to the assumed eccentricity of the shaft, clearance between the rotating hub 42 and the nonrotatable second ring 20 is slightly greater than normal at one side of the hub and is slightly less than normal at the opposite side of the hub. Fig. 3 shows the position wherein the clearance is greater than normal and it will be obvious that this does not in any way change the sealing effectiveness of the ring 26. The ring engages the conical surface 24 in the same position as in Fig. 2, but its engagement with the perpendicular surface 22 varies with the amount of shaft eccentricity without, however, changing the sealing effectiveness.

Fig. 4 shows the longitudinal spacing between the rings 18 and 20 as being somewhat greater than the normal or preferred spacing as shown in Fig. 2. By reason of the greater longitudinal spacing the sealing ring 26 engages the conical surface 24 at an annular zone somewhat nearer the inner edge of the said surface. However, the sealing effectiveness is not impaired. Obviously if the longitudinal spacing were somewhat less than normal, the sealing ring would engage the conical surface 24 at an annular zone somewhat farther from the inner edge of said surface, but the sealing effectiveness would not be impaired.

Whether the parts are in the preferred relationship as shown in Fig. 2 or are somewhat out of such relationship as shown in Figs. 3 and 4, the ring 26 provides an effective seal. As has been stated, the ring is under tension and preferably the ring is so designed that with the shaft idle the tension in the ring is somewhat greater than that necessary for effective sealing. During rotation of the shaft the ring 26 also rotates, presumably at about one-half of the speed of the shaft, and the centrifugal force in the rotating ring tends to expand it and to reduce the pressure thereof against the surfaces 22 and 24. The reduction of pressure serves to materially reduce wear at higher speeds, but the pressure is always sufficient for satisfactory sealing.

The several parts of the oil seal as shown in Figs. 1 to 5 are particularly shaped and related to facilitate assembly. As before stated, the hub 42 of the ring 18 has an outer cylindrical surface. The conical surface 24 on the ring 20 extends inwardly to a sharp inner edge which is at a position that provides only a small clearance between it and the outer cylindrical surface of the hub. The said small clearance is substantially less than the cross sectional or minor radius of the sealing ring 26. In assembly the ring 18 and the sealing ring 26 together with the snap rings 30, 30 are put in place first, the sealing ring 26 engaging the hub 42 as shown in Fig. 5. Then the ring 20 is moved longitudinally toward the surface 22 and toward the sealing ring 26, that is, in the direction of the arrow in Fig. 5. As shown, the lower edge of the conical surface 24 engages the sealing ring 26 at a line spaced inwardly from the center thereof, the engagement being such that continued movement of the ring 20 beyond the position shown in Fig. 5 causes the expansion of the sealing ring 26 so that it occupies the position shown in Fig. 2. As the final step of assembly the rings 32, 32 are put in place to lock the parts in their assembled normal relationship.

The alternative embodiment of the invention as shown in Figs. 6 and 7 includes two closely spaced rigid rings 44 and 46 which correspond to the rings 18 and 20 in that they are adapted to be connected respectively to the shaft and to the housing.

The rings 44 and 46 are provided respectively with outwardly diverging annular surfaces 48 and 50 which face each other and which have the included angle between them on the order of 45°. Preferably and as shown, the surface 48 on the ring 44 is conical and is inclined inwardly and toward the second ring 46 and the surface 50 on the ring 46 is perpendicular to the axis of the shaft. A sealing ring 52 is provided which is similar to the sealing ring 26 and which engages the surfaces 48 and 50. The sealing ring 52 has the same functions as the sealing ring 26 and further description is unnecessary.

The outer portion 53 of the ring 44 constitutes an oil slinger portion having the same function as the oil slinger portion 40 on the ring 18 as shown in Figs. 1 to 5.

Associated respectively with the first and second rings 44 and 46 are sealing rings 54 and 56 which have the same function as the previously described sealing rings 36 and 38.

Preferably the sealing device shown in Figs. 6 and 7 has its parts connected so that they can be preassembled, thus making it unnecessary to assemble them in place as has been described in connection with the sealing device shown in Figs. 1 to 5. To this end, one of the rings has an annular flange which extends longitudinally past the other ring, means being carried by the flange for engaging said other ring to limit movement of the two rings away from each other.

As shown, the second ring 46 has an annular longitudinal flange 58 which surrounds and extends past the first ring 44. The flange 58 has an annular groove therein and a snap ring 60 is entered in the said groove. An annular ring or pad 62 formed of felt or equivalent material is cemented to the snap ring 60 and is in engagement with the adjacent lateral face of the ring 44 to hold the said ring in proper spaced relationship with the second ring 46. The sealing ring 52 by reason of the tension therein tends to move the two rings 44 and 46 away from each other and the snap ring 60 and the felt pad 62 serve to limit the movement of said rings 44 and 46 away from each other. The flange 58 has a plurality of notches 64, 64 which serve to permit oil to enter the annular space between the two rings 44 and 46.

The sealing device as shown in Figs. 6 and 7 can be manufactured, sold and handled as a separate self-contained unit. When it is to be used it can be assembled with a shaft 66 and a housing 68 in the manner shown in Fig. 7. As shown, the housing 68 has a shoulder 70 which engages the flange 58 on the ring 46 to limit movement of the ring toward the left. Snap rings 72, 72 similar to the snap rings 32, 32 prevent movement of the ring 46 toward the right. The described connection between the ring 46 and the ring 44 prevents any longitudinal movement of the latter.

The invention claimed is:

1. In a sealing device for use with a housing having a cylindrical opening and a rotatable shaft extending through said opening and concentric therewith, the combination of first and second rigid rings closely spaced longitudinally and adapted to be positioned adjacent the housing opening and surrounding the shaft which rings respectively have outwardly diverging annular surfaces that are integral therewith and that face each other with the included angle between them on the order of 45°, said first ring being constructed and arranged for interior sealing engagement with the shaft so as to be rotated by said shaft with all portions of said first ring spaced from the housing and said second ring being constructed and arranged for exterior sealing engagement with the housing so as to be held stationary by said housing with all portions of said second ring spaced from the shaft, and a sealing ring formed of resilient flexible material interposed between said rigid rings and engaging said annular surfaces thereof, said resilient sealing ring being under a substantial tension which maintains it in pressed engagement with said annular surfaces of said rigid rings so as to effect a liquid-tight seal between said rings.

2. In a sealing device for use with a housing having a cylindrical opening and a rotatable shaft extending through said opening and concentric therewith, the combination of first and second rigid rings closely spaced longitudinally and adapted to be positioned adjacent the opening and surrounding the shaft which rings respectively have outwardly diverging annular surfaces that are integral therewith and that face each other with the included angle between them on the order of 45°, said first ring being constructed and arranged for interior sealing engagement with the shaft so as to be rotated by said shaft with all portions of said first ring spaced from the housing and said second ring being constructed and arranged for exterior sealing engagement with the housing so as to be held stationary by said housing with all portions of said second ring spaced from the shaft, a sealing ring formed of resilient flexible material interposed between said rigid rings and engaging said annular surfaces thereof and spaced inwardly from the periphery of said annular flange, said resilient sealing ring being under a substantial tension which maintains it in pressed engagement with said annular surfaces of said rigid rings so as to effect a liquid-tight seal between said rings, and an annular slinger portion on the rotatable ring at the side thereof remote from the nonrotatable ring and having a diameter substantially larger than the exterior main diameter of the sealing ring.

3. In a sealing device for use with a housing having a cylindrical opening and a rotatable shaft extending through said opening and concentric therewith, the combination of first and second rigid rings closely spaced longitudinally and adapted to be positioned adjacent the housing opening and surrounding the shaft, which first ring is constructed and arranged for interior sealing engagement with the shaft so as to be rotated by said shaft with all portions of said first ring spaced from the housing and which second ring is constructed and arranged for exterior sealing engagement with the housing so as to be held stationary by said housing with all portions of said second ring spaced from the shaft, and said first ring having a surface substantially perpendicular to the shaft and facing the second said ring and said second ring having a conical surface which faces said first ring and is inclined inwardly and toward said first ring, and a sealing ring formed of resilient flexible material interposed between said first and second rings and engaging said perpendicular and conical surfaces thereof, said resilient sealing ring being under a substantial tension which maintains it in pressed engagement with said perpendicular and conical surfaces of said first and second rings so as to effect a liquid-tight seal between said rings.

4. In a sealing device for use with a housing having a cylindrical opening and a rotatable shaft extending through said opening and concentric therewith, the combination of first and second rigid rings closely spaced longitudinally and adapted to be positioned adjacent the opening and surrounding the shaft, which first ring is constructed and arranged for interior sealing engagement with the shaft so as to be rotated by said shaft with all portions of said first ring spaced from the housing and which second ring is constructed and arranged for exterior sealing engagement with the housing so as to be held stationary by said housing with all portions of said second ring spaced from the shaft, and said first ring having a surface substantially perpendicular to the shaft and facing said second ring and having a hub extending along the shaft from the said perpendicular surface and said second ring surrounding the hub of said first ring and having a conical surface facing the perpendicular surface of said first ring and inclined inwardly and toward said surface and toward the outer face of the hub of said first ring to provide only a small clearance between the inner edge of the conical surface and the outer face of the hub, and a sealing ring formed of resilient flexible material and having circular cross sectional shape which ring is initially engageable with the hub of said first ring adjacent the perpendicular surface thereof and has the radius of its circular cross sectional shape substantially greater than the aforesaid small clearance, said greater radius of the sealing ring enabling said second ring upon longitudinal movement thereof to engage and stretch said sealing ring so as to cause it to engage said conical surface and said perpendicular surface under a substantial tension which maintains it in pressed engagement with said surfaces to effect a liquid-tight seal between said rings.

5. In a sealing device for use with a housing having a cylindrical opening and a rotatable shaft extending through said opening and concentric therewith, the combination of first and second rigid rings closely spaced longitudinally and adapted to be positioned adjacent the opening and surrounding the shaft which first ring is engageable interiorly with the peripheral face of the shaft and is rotatable therewith with all portions of said ring spaced from the housing and which second ring is engageable exteriorly with the inner face of the opening and is nonrotatable with all portions of said ring spaced from the shaft, said second ring having a surface substantially perpendicular to the shaft and facing said first ring and said first ring having a conical surface which faces said second ring and is inclined inwardly and toward said second ring, and a sealing ring formed of resilient flexible material interposed between said second and first rings and engaging said perpendicular and conical surfaces thereof, said resilient sealing ring being under a substantial tension which maintains it in pressed engagement with said perpendicular and conical surfaces of said second and first rings so as to effect a liquid-tight seal between said rings.

6. In a sealing device for use with a housing having a cylindrical opening and a rotatable shaft extending through said opening and concentric therewith, the combination of first and second rigid rings closely spaced longitudinally and adapted to be positioned adjacent the opening and surrounding the shaft which first ring is engageable interiorly with the peripheral face of the shaft and is rotatable therewith with all portions of said ring spaced from the housing and which second ring is engageable exteriorly with the inner face of the opening and is nonrotatable with all portions of said ring spaced from the shaft, said rings respectively having outwardly diverging annular surfaces which face each other and which have the included angle between them on the order of 45°, a sealing ring formed of resilient flexible material interposed between said rigid rings and enagaging said annular surfaces thereof, said resilient sealing ring being under a substantial tension which maintains it in pressed engagement with said annular surfaces of said rigid rings so as to effect a liquid-tight seal between said rings, an annular flange on one ring extending longitudinally past the other ring, and means on said flange engaging said other ring to limit relative movements of the rings away from each other.

7. In a sealing device for use with a housing having a cylindrical opening and a rotatable shaft extending through said opening and concentric therewith, the combination of first and second rigid rings closely spaced longitudinally and adapted to be positioned adjacent the opening and surrounding the shaft which first ring is engageable interiorly with the peripheral face of the shaft and is rotatable therewith with all portions of said ring spaced from the housing and which second ring is engageable exteriorly with the inner face of the opening and is nonrotatable with all portions of said ring spaced from the shaft, said rings respectively having outwardly diverging annular surfaces which face each other and which have the included angle between them on the order of 45°, a sealing ring formed of resilient flexible material interposed between said rigid rings and engaging said annular surfaces thereof, said resilient sealing ring being under a substantial tension which maintains it in pressed engagement with said annular surfaces of said rigid rings so as to effect a liquid-tight seal between said rings, an annular flange on the nonrotatable ring extending longitudinally past and surrounding the rotatable ring, a flat ring carried by said annular flange and extending inwardly therefrom, and an annular felt pad carried by the last said ring and said rotatable ring to limit relative movement of the rings away from each other.

References Cited in the file of this patent

UNITED STATES PATENTS

| | | |
|---|---|---|
| 2,231,690 | Sheldrick et al. | Feb. 11, 1941 |
| 2,691,542 | Chenoweth | Oct. 12, 1954 |
| 2,706,652 | Berger | Apr. 19, 1955 |
| 2,714,025 | Heinrich | July 26, 1955 |